United States Patent

Barie, Jr.

[15] 3,655,499
[45] Apr. 11, 1972

[54] POLYTETRAALLYL BENZOPHENONETETRACAR-BOXYLATE

[72] Inventor: Walter P. Barie, Jr., Shaler Township, Allegheny County, Pa.

[73] Assignee: Gulf Research & Development Company, Pittsburgh, Pa.

[22] Filed: July 2, 1970

[21] Appl. No.: 52,115

[52] U.S. Cl. .................................161/88, 117/76, 161/194, 260/63
[51] Int. Cl. ...................................................B32b 27/04
[58] Field of Search.....................161/88, 93, 194, 198, 168; 260/63 K, 63 R; 117/16, 28, 76 R, 76 F, 76 T

[56] References Cited

UNITED STATES PATENTS

| 3,213,063 | 10/1965 | Horan et al. | 161/194 X |
| 3,366,668 | 1/1968 | Strobel et al. | 760/63 X |

Primary Examiner—Philip Dier
Attorney—Meyer Neishloss, Deane E. Keith and Donald L. Rose

[57] ABSTRACT

The homopolymer of tetraallyl benzophenonetetracar-boxylate is described. It is prepared as a casting resin or is used in preparing laminates.

5 Claims, No Drawings

POLYTETRAALLYL BENZOPHENONETETRACARBOXYLATE

This invention relates to the preparation of homopolymers from tetraallyl benzophenonetetracarboxylate. It is known that certain diallyl compounds will homopolymerize to form solid thermoplastic resins. For example, diallyl phthalate with a small amount of benzoyl peroxide will cure to a solid polymer when heated above 180° F. However, in the case of triallyl compounds such as triallyl cyanurate, the reactivity is so great that a useful homopolymer cannot be formed. For example, when triallyl cyanurate is heated with a peroxide catalyst to initiate the homopolymerization reaction, the highly exothermic reaction quickly runs away causing a substantial overheating during the reaction and resulting in a charred or cracked product. This especially occurs when castings are prepared. Triallyl cyanurate reactivity is so great as to disincline manufacturers to attempt prepolymerizing, hence it is commonly used as a copolymer with rather special alkyds so as to form highly reactive triallyl cyanurate-polyester systems. (ALLYLIC RESINS AND MONOMERS by H. Raech, Jr., Reinhold Publishing Corp., New York, 1965, page 82).

Unexpectedly I have discovered that tetraallyl benzophenonetetracarboxylate can be homopolymerized to polytetrallyl benzophenonetetracarboxylate in a smooth reaction to form a useful homopolymer of high quality, notwithstanding the fact that it has more reactive sites than triallyl cyanurate. Since there are four allyl groups in each molecule of tetraallyl benzophenonetetracarboxylate, there are eight reactive sites in each molecule, that is, at each carbon forming the allylic double bonds. Thus it is surprising that the controlled homopolymerization of tetraallyl benzophenonetetracarboxylate can be carried out to produce a useful product.

Since tetrallyl benzophenonetetracarboxylate is a viscous liquid at room temperature, it is a relatively simple matter to incorporate a small amount of a reaction initiator into the monomer before it is poured into a mold so that it can be cured into a casting. When the monomer is to be cured with a matrix into a laminate, it is generally desirable to prepare a solution of the monomer and reaction initiator using a suitable solvent in order to make the monomer more fluid so that it is easier to apply the monomer and to better control the amount of the monomer that is incorporated into the laminate.

In preparing the homopolymers of tetraallyl benzophenonetetracarboxylate it is necessary to use any suitable free radical initiator to promote the reaction. Suitable free radical initiators include diacyl peroxides such as benzoyl peroxide, lauroyl peroxide, p-chlorobenzoyl peroxide, etc.; a hydroperoxide such as t-butyl hydroperoxide, cumene hydroperoxide, 2,5-dimethyl-hexyl-2,5-dihydroperoxide, etc.; a peroxyester such as t-butyl perbenzoate, t-butyl peracetate, t-butyl peroxyisobutyrate, di-t-butyldiperphthalate, etc.; an alkyl peroxide such as di-t-butyl peroxide, dicumyl peroxide, 2,5-dimethyl-2,5-di(t-butyl-peroxy)hexane, etc. Preferred peroxides are benzoyl peroxide, t-butyl perbenzoate and dicumyl peroxide. When tetraallyl benzophenonetetracarboxylate is heated to 280° C. without the presence of a free radical initiator, the resulting product is a black, charred unusable mass.

In preparing a casting the tetraallyl benzophenonetetracarboxylate together with a suitable free radical initiator can be cured by a suitable curing procedure into a clear casting. Alternatively, modified castings can be made by the incorporation of fillers into the monomer prior to curing. These fillers have the function of modifying the properties of the casting including the hardness, strength, temperature resistance, minimize crazing, etc., and can also effectively reduce the cost of the resulting casting. Suitable filler materials include particulate material such as aluminum powder, powdered calcium carbonate, silica, kaolinite (clay), magnesium silicate, etc.

As indicated, the tetraallyl benzophenonetetracarboxylate can also be effectively used in producing reinforced laminates. These laminates are made from a fibrous mat or by laying together a multiplicity of sheets of material to form a matrix and consolidating the matrix into a unitary structure by flowing the monomer through the fibrous material and curing it while in a mold or hydraulic press to form the polytetraallyl benzophenonetetracarboxylate. The core or matrix is most commonly fibrous in nature and can be of a regular orientation such as resulting from weaving or can be random in pattern such as in floc and paper. The fiber forming the core or matrix can be either a natural fiber or a synthetic fiber such as cellulose derived from wood, cotton, linen, sisal hemp, etc., asbestos, glass, nylon, polyester, cellulose acetate, etc.

Woven glass fabrics are well known for forming resin bonded laminates and are readily commercially available. The fabrics are made from various yarn sizes and come in different weaves in various thicknesses. It is particularly desirable in preparing glass laminates hereunder using a polytetraallyl benzophenonetetracarboxylate binder that the glass fabric be coated or finished with a material which will substantially increase the bond strength of the resin-glass bond. Particularly preferred are finishes which react with the resin during the cure such as the amino silanes, epoxy-modified methoxy silanes, vinyl silane and methacrylato-chromium chloride complex and which are chemically bonded to the glass. This type of bonding, at this critical region of the composite, produces high mechanical strength and good retention of properties.

The laminates can be prepared by any suitable procedure. The sheets or mats of core material are impregnated or coated by any suitable means such as by brushing or dipping. The impregnated core material, in layers if sheets are stacked together or as a single layer if a mat is used, is consolidated and shaped, if desired, in a mold under heat and pressure. The application of mold pressures in excess of about 20 p.s.i. and preferably about 50 p.s.i. to about 200 p.s.i. during the curing process is advantageous not only to obtain a product of desired shape but also to help control the resin content by squeezing out excess material. Under proper compression excess resin is squeezed out and the glass laminate is compressed to increase the glass to resin ratio and direct the laminate to the glass to resin ratio of maximum flexural strength.

The polymerization of tetraallyl benzophenonetetracarboxylate is thermally initiated using a free radical reaction initiator or promoter as described. The reaction rate is, in part, dependent on the availability of free radicals produced by the thermal decomposition of the free radical initiator and it is also, in part, dependent on the reactivity of the relatively stable allyl radical. Since the reaction rate of the allyl radical is very low at moderate temperatures, it is necessary to use a temperature greater than 77°–80° C. to completely cure the material. Therefore, it is desirable to use a free radical initiator with a relatively high decomposition temperature, that is, generally within the range of temperature at which the allyl radical is reactive, in order to obtain optimum properties in the resulting resin. For this reason, t-butyl perbenzoate is a very satisfactory reaction promoter.

As pointed out, the polymerization of tetrallyl benzophenonetetracarboxylate should be carried out at a temperature greater than 77°–80° C. A satisfactory curing procedure is a temperature of about 77° C. to about 150° C. for about 0.5 to about 24 hours and preferably about 100° C. to about 125° C. for about 1 to about 2 hours. Desirably a post-cure can be utilized to optimize the properties. A suitable post-cure can be carried out at a temperature of about 150° C. to about 220° C. for about 0.5 to about 24 hours and preferably about 160° C. to about 180° C. for about 0.5 to about 2 hours. Some additional improvement in properties is available from a pre-cure. This pre-cure can be carried out at a temperature of about 60° C. to about 80° C. for about 0.5 to about 5 hours and preferably at about 70° C. to about 77° C. for about 0.5 to about 1 hour.

Although a curing program in finite steps is indicated in the suggested combination of a curing cycle and a post-curing cycle as well as an optional pre-curing cycle, it is also feasible and convenient to use a curing program which involves either a series of relatively small incremental temperature increases or a continuous, gradual temperature increase within the desired temperature range, provided that the net effect is essentially the same, that is, a substantially fully cured product.

Tetraallyl benzophenonetetracarboxylate can be prepared from benzophenonetetracarboxylic dianhydride which is commercially available. The dianhydride is refluxed with an excess of methanol to form tetramethyl benzophenonetetracarboxylate. The tetramethyl ester is then transesterified using an excess of allyl alcohol and a suitable transesterification catalyst such as tetrabutyl titanate by distilling off the methyl alcohol as it is generated. Suitable conventional purification procedures can be utilized.

In preparing a casting 10.0 grams of tetraallyl benzophenonetetracarboxylate and 0.1 gram of t-butyl perbenzoate were mixed at room temperature and then poured into a mold for curing. The material was heated in an oven at 77° C. for 1 hour as a pre-cure, then it was heated at 125° C. for 2 hours as the curing step, and it was finally heated at 175° C. for 2 hours to post-cure the resin. The resulting product, after cooling to room temperature, had a Barcol hardness (934-1) of 55 and a heat distortion temperature (ASTM D-648) of 190° C.

A number of 7-inch 181 glass cloth squares having a gamma aminopropyltriethoxysilane (Linde A1100) finish were twice dipped into a solution containing 25.0 grams of tetraallyl benzophenonetetracarboxylate, 0.25 gram of t-butyl perbenzoate and 59.0 grams of acetone in order to obtain good coverage. These squares were then hung up overnight to permit the acetone solvent to evaporate. A series of 12-ply laminates were made by stacking these squares and curing them under pressure in a heated press at different conditions. The cured laminate having the optimum properties was subjected to a pressure of 50 p.s.i. for 30 seconds, then it was heated to 160° C. for 30 minutes to cure it while maintaining the 50 p.s.i. pressure on the laminate. The pressure was then removed and the laminate was post-cured at 200° C. for 2 hours. The cooled laminate had a flexural strength (ASTM D-790) of 35,600 p.s.i.

It should be understood that the above examples are merely illustrative of the principles of the present invention and that various modifications may be made in the examples given without departing from the spirit and scope of the invention as defined in the following claims.

I claim:

1. Solid polymerized tetraallyl benzophenonetetracarboxylate.

2. Solid polymerized tetraallyl benzophenonetetracarboxylate in accordance with claim 1 having a particulate material embedded therein.

3. Solid polymerized tetraallyl benzophenonetetracarboxylate in accordance with claim 1 having a fibrous material embedded therein.

4. Solid polymerized tetraallyl benzophenonetetracarboxylate in accordance with claim 3 in which the fibrous material is glass cloth.

5. Solid polymerized tetraallyl benzophenonetetracarboxylate in accordance with claim 4 in which the glass cloth is in layers.

* * * * *